UNITED STATES PATENT OFFICE.

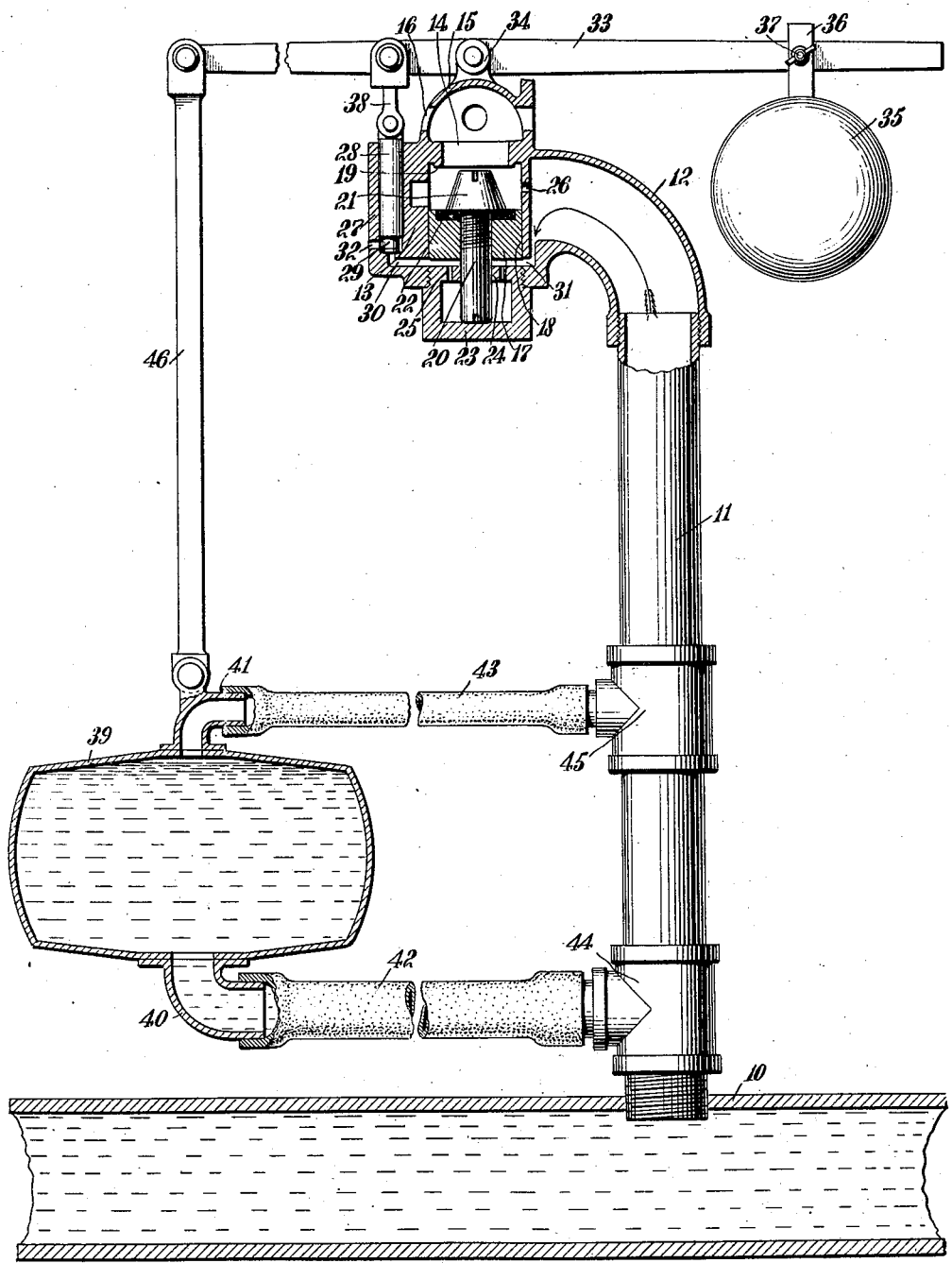

JOHN DANIEL BROWER, JR., OF PACIFIC GROVE, CALIFORNIA.

ESCAPE-VALVE.

1,005,686.  Specification of Letters Patent.   Patented Oct. 10, 1911.

Application filed October 14, 1909. Serial No. 522,556.

*To all whom it may concern:*

Be it known that I, JOHN D. BROWER, Jr., a citizen of the United States, and a resident of Pacific Grove, in the county of Monterey and State of California, have invented a new and Improved Escape-Valve, of which the following is a full, clear, and exact description.

This invention relates to escape valves for use in connection with water mains and the like, to permit the escape of air or gas from the main when water or other fluid is allowed to enter the same, and relates more particularly to a device of this class comprising a main valve adapted to control the escape of the gas or air from the main, and an auxiliary valve controlling the main valve, and itself operable by the liquid in the main or conduit.

The object of the invention is to provide a simple, strong and durable escape valve for controlling the flow of air or gas from water mains and the like, which is so constructed that the parts thereof are easily accessible for adjustment or repair, which permits the escape of air or gas from mains or other conduits when water or other liquid flows into the same, which will open when the water or other liquid recedes, and which obviates the possibility of water hammers, due to the premature closing of the valve.

The invention consists in the construction and combination of parts to be more fully described hereinafter and particularly set forth in the claims.

Reference is to be had to the accompanying drawing forming a part of this specification, in which the figure is a partial longitudinal section of my invention, showing the same associated with a water main.

Before proceeding to a more detailed explanation of my invention, it should be clearly understood that while it is particularly useful in connection with the mains of water supply systems, it can also be advantageously employed with other conduits for fluid, which it is desired to free from air or gas when the fluid enters the same. When the fluid is turned into an empty conduit it naturally forces the air or gas in the conduit to the upper parts of the same. Water systems and the like are usually provided with escape valves to permit the air or gas to flow out of the conduits, before the advancing liquid, and which are closed by the liquid itself. It has been found however, that the first rush of the liquid will compress such air as cannot escape and the compressed air will prematurely seat the valve and thus prevent the entire quantity of air from escaping. Again, the valves often remain seated when the liquid recedes if some pressure obtains in the main, with the consequence that water hammers result. My invention is designed to overcome these difficulties, and to effect this purpose I employ an auxiliary valve which controls the main valve and which itself is directly operable by the liquid in the main, as will appear more clearly hereinafter. The device can be fashioned from any suitable material, though I prefer to employ a non-corrosive metal.

Referring more particularly to the drawing, I have shown for example, a water main 10 having associated therewith a stand pipe 11, which at the upper end has an elbow 12 communicating with the escape valve casing 13 and secured to the stand pipe in the usual manner. The escape valve casing at the top has an outlet opening 14 protected by a hood 15 provided with outlets 16. A plunger or valve member 17 is slidably located under the outlet opening 14 in a preferably cylindrical slideway 18 of the valve casing, and is adapted to rest against the valve seat 19 formed under the opening, so that it serves to close the same. A partly threaded valve stem 20 extends through an opening in the valve member 17 and has a tapered head 21 at the other side of the valve member, which serves to hold in place the valve member face 22 of rubber, Babbitt-metal or the like, said head being tapered so that the outlet 14 is gradually closed when the valve is operated.

The casing has an extension 23 into which the valve stem can move through a guide opening 24. Apertures 25 in the wall of the casing adjacent to the opening 24, permit the free movement of the valve stem. The valve casing has an inlet 26 to the valve chamber, from the elbow, which is substantially annular and extends preferably around the cylindrical guideway 18.

The valve casing has a cylindrical casing 27 having a guideway in which is slidably located a plunger 28 constituting an auxiliary valve and having a reduced end 29 adapted to close an auxiliary valve passage 30 which communicates with the space under the valve member 17, and coöperates with an inlet 31 through which liquid can enter from the elbow 12 to force the valve member 17 upward against the valve seat. The passage 30 at the side of the auxiliary valve remote from the main valve has an outlet 32.

A lever 33 is pivotally mounted by means of a suitable bracket 34 upon the hood 15 and at one end carries an adjustable counterpoise 35 mounted upon the lever by means of an arm 36, and having a set screw 37. A pivoted link 38 operatively connects the lever 33 and the auxiliary valve.

I employ a movable reservoir 39 of any suitable form, having an inlet 40 and an outlet 41 connected respectively, by means of suitable, flexible tubing 42 and 43, or in any other convenient manner, with suitable T's 44 and 45 of the stand pipe. A link 46 is pivotally mounted upon the reservoir and at the end of the lever 33 remote from the counterpoise 35, and operatively connects the two.

In the normal position of the parts, the reservoir 39 being empty, the counterpoise 35 holds the lever 33 depressed at the free end so that the auxiliary valve 28 is elevated and the passage 30 is unobstructed. The main valve is open, so that when fluid enters the main, the air can be expelled through the stand pipe 11, the inlet 26, the outlet 14, and the openings 16. As the passage 30 is unobstructed, the air escaping from the stand pipe cannot raise the main valve to close the outlet 14. When the liquid however, reaches a level such that the reservoir is filled, the weight of the filled reservoir overbalances that of the counterpoise, and the lever 33 is operated to close the auxiliary valve.

As is well known, when air or other gas under pressure escapes from a container through a comparatively small orifice, it tends to produce a vacuum at the outside of the orifice. Consequently, the pressure within the container is substantially in excess of that at the outside of the orifice. Upon this action depends the operation of my valve. The gas or air escaping through the orifice 26 tends to create a vacuum at the upper side of the valve body 17. Consequently, the pressure within the elbow 12 is considerably in excess of that within the valve casing at the other side of the opening 26. Therefore when the plunger 28 is depressed to close the passage 33, the pressure under the valve member 27, which is equal to that in the elbow 12, exceeds the pressure above the valve member 17, and the latter is therefore raised and the outlet is closed.

Having thus described my invention, I claim as new, and desire to secure by Letters Patent:—

1. A device of the class described, comprising a main valve adapted to control the escape of air from a conduit and adapted to be closed by pressure in the conduit, and an auxiliary valve adapted to prevent the closing of said main valve, and adapted to be rendered inoperative by the liquid in the conduit remote from said auxiliary valve.

2. A device of the class described, comprising a main valve adapted to control the escape of air from a conduit, and an auxiliary valve controlling said main valve, and operable by the rise of liquid in said conduit to a predetermined level below the level of said auxiliary valve.

3. A device of the class described, comprising a main valve adapted to control the escape of air from a conduit, an auxiliary valve controlling said main valve, and a reservoir adapted to be filled with liquid from the conduit, and controlling said auxiliary valve.

4. A device of the class described, comprising a valve casing having an outlet opening, a main valve controlling said outlet opening, a conduit communicating with said casing, an auxiliary valve in said casing and controlling said main valve, and a movable reservoir controlling said auxiliary valve.

5. A device of the class described, comprising a casing adapted to communicate with a conduit, and formed to have air from said conduit escape therethrough, a main valve in said casing controlling the flow of air therethrough, said casing having a passage whereby liquid entering said passage serves to close said main valve, an auxiliary valve controlling said passage, and a movable reservoir adapted to be filled with liquid from the conduit, and controlling said auxiliary valve.

6. A device of the class described, comprising a casing adapted to communicate with a conduit, and formed to have air from said conduit escape therethrough, a main valve in said casing controlling the flow of air therethrough, said casing having a passage whereby liquid entering said passage serves to close said main valve, an auxiliary valve controlling said passage, a movable reservoir adapted to be filled with liquid from the conduit and controlling said auxiliary valve, and a counter-weight operatively connected with said auxiliary valve and said reservoir, whereby said auxiliary valve is closed when said reservoir is full.

7. A device of the class described, comprising a valve casing having an outlet opening, a main valve controlling said outlet opening, a conduit communicating with said casing, an auxiliary valve in said casing, and a movable reservoir controlling said auxiliary valve, said main valve having a valve stem guided to move in said casing and provided with a tapered head, whereby said main valve serves to close said outlet opening gradually.

8. A device of the class described, comprising a valve casing, a main valve movably arranged therein, said valve casing having an outlet opening controlled by said main valve, said casing having passages whereby fluid can enter said casing at both sides of said main valve, and an auxiliary valve for controlling one of said passages.

9. A device of the class described, comprising a valve casing, a main valve movably arranged therein, said valve casing having an outlet opening controlled by said main valve, said casing having passages whereby fluid can enter said casing at both sides of said main valve, an auxiliary valve for controlling one of said passages, a movable reservoir adapted to be filled with liquid, a pivoted lever operatively connected with said reservoir and said auxiliary valve, and a counterpoise upon said lever.

10. A device of the class described, comprising a casing adapted to communicate with a conduit and having an outlet, a main valve slidably arranged within said casing and adapted to close said outlet opening, said casing having passages giving access to both sides of said main valve, an auxiliary valve slidably located in said casing and adapted to obstruct one of said passages, said main valve having a valve stem, said casing having means for guiding said valve stem, a reservoir arranged to move and having an inlet and an outlet, means for flexibly connecting said inlet and said outlet of said reservoir with a conduit, a lever pivoted upon said casing, a link connecting said lever and said auxiliary valve, and a link connecting said lever and said reservoir.

11. A device of the class described, comprising a stand pipe, a casing communicating therewith and having a valve chamber and an outlet opening provided with a valve seat, a main valve slidable in said valve chamber and adapted to rest against said valve seat, said main valve having a stem guided within said casing and provided with a tapered head, whereby said main valve serves to close said opening gradually, said casing having passages above and below said main valve, an auxiliary valve for closing said passage under said main valve, a lever pivotally mounted upon said casing, a reservoir having an inlet and an outlet, flexible connections between said inlet and said outlet and said stand pipe, a link connecting said reservoir and said lever, a second link connecting said auxiliary valve and said lever, and an adjustable counterpoise upon said lever.

In testimony whereof I have signed my name to this specification in the presence of two subscribing witnesses.

JOHN DANIEL BROWER, Jr.

Witnesses:
ELMER GEORGE BRUA,
THOMAS FARWELL ROGERS.